US011563383B2

United States Patent
Allert et al.

(10) Patent No.: US 11,563,383 B2
(45) Date of Patent: Jan. 24, 2023

(54) DEVICE FOR CONNECTING A SUB-NETWORK TO AN ALTERNATING VOLTAGE NETWORK AND METHOD FOR CONTROLLING AN ELECTRICAL POWER

(71) Applicant: SMA Solar Technology AG, Niestetal (DE)

(72) Inventors: Claus Allert, Kaufungen (DE);
Mathias Buenemann, Kassel (DE);
Matthias Groene, Kassel (DE);
Alexander Unru, Baunatal (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 17/005,783

(22) Filed: Aug. 28, 2020

(65) Prior Publication Data
US 2020/0395865 A1 Dec. 17, 2020

Related U.S. Application Data

(63) Continuation of application No. PCT/EP2019/054450, filed on Feb. 22, 2019.

(30) Foreign Application Priority Data

Feb. 28, 2018 (DE) .................. 10 2018 104 604.9

(51) Int. Cl.
*H02J 3/06* (2006.01)
*H02M 5/14* (2006.01)
(Continued)

(52) U.S. Cl.
CPC .............. *H02M 5/14* (2013.01); *H02J 3/06* (2013.01); *H02J 3/26* (2013.01); *H02J 3/28* (2013.01); *H02J 3/36* (2013.01)

(58) Field of Classification Search
CPC ........ H02J 3/06; H02J 3/04; H02J 3/26; H02J 3/36; H02J 3/28; H02M 5/14
See application file for complete search history.

(56) References Cited

U.S. PATENT DOCUMENTS

2012/0280566 A1 11/2012 Umland
2012/0316691 A1* 12/2012 Boardman ............... H02J 3/26
700/293
(Continued)

FOREIGN PATENT DOCUMENTS

CN 104065099 A * 9/2014
DE 102011078047 A1 12/2012
(Continued)

OTHER PUBLICATIONS

International Search Report dated Apr. 11, 2019 in connection with PCT/EP2019/054450.

*Primary Examiner* — Harry R Behm
(74) *Attorney, Agent, or Firm* — Eschweiler & Potashnik, LLC (57) ABSTRACT

A method for controlling an electrical power which flows into or out of an electrical subnetwork via a connection point is disclosed. The subnetwork has at least one electrical load, and the electrical load is connected to a control device via a communication connection, the electrical power flowing via the connection point is measured and a maximum power consumption of the electrical load is set by means of the control device on the basis of the electrical power flowing via the connection point. A device for connecting a multiphase subnetwork, which has an energy production installation and an energy store, to a superordinate multiphase alternating voltage network is configured to transmit electrical power between the alternating voltage network and the subnetwork and comprises an AC/AC converter having a network connection, two inverter bridge circuits with an (Continued)

interposed intermediate circuit and a subnetwork connection. The device also comprises a control device which is configured to set the electrical powers flowing via the individual phases of the subnetwork connection on the basis of power values of the energy production installation and/or of the energy store by suitably controlling the inverter bridge circuits of the AC/AC converter.

10 Claims, 4 Drawing Sheets

(51) Int. Cl.
*H02J 3/28* (2006.01)
*H02J 3/26* (2006.01)
*H02J 3/36* (2006.01)

(56) References Cited

U.S. PATENT DOCUMENTS

| | | | | |
|---|---|---|---|---|
| 2013/0015703 | A1* | 1/2013 | Rouse | H02J 3/06 307/18 |
| 2015/0207322 | A1* | 7/2015 | Nakao | H02J 3/38 307/23 |
| 2017/0310232 | A1* | 10/2017 | De Hoog | H02J 3/381 |

FOREIGN PATENT DOCUMENTS

| | | |
|---|---|---|
| DE | 102012212108 A1 | 1/2014 |
| DE | 102015105152 A1 | 10/2016 |
| DE | 102015211196 A1 | 12/2016 |
| DE | 102017108606 A1 | 10/2017 |
| DE | 102016110716 A1 | 12/2017 |
| WO | WO-2018020297 A1 * 2/2018 | ............. H02J 3/381 |

* cited by examiner

DEVICE FOR CONNECTING A SUB-NETWORK TO AN ALTERNATING VOLTAGE NETWORK AND METHOD FOR CONTROLLING AN ELECTRICAL POWER

CROSS REFERENCE TO RELATED APPLICATIONS

This application is a continuation of International Patent Application number PCT/EP2019/054450, filed on Feb. 22, 2019, which claims priority to German Patent Application number 10 2018 104 604.9, filed on Feb. 28, 2018, and is hereby incorporated by reference in its entirety.

FIELD

The disclosure relates to a device for connecting a subnetwork to an alternating voltage network, to a method for controlling an electrical power which flows into or out of a subnetwork via a connection point, and to a method for operating a subnetwork.

BACKGROUND

An alternating voltage network for transporting and distributing electrical power can be subdivided into different network sections. In addition, there may be a subdivision into network levels, wherein different network levels generally have different network voltages and are connected to one another via transformers. Within such a network level, network sections are formed by connecting subnetworks, for example households, industrial companies or towns, to the alternating voltage network via connection points, wherein the network voltage is substantially identical on both sides of these connection points, that is to say these connection points do not comprise any voltage transformation between the alternating voltage network at the location of the connection point and the subnetwork connected to the alternating voltage network via the connection point.

Various electrical energy-producing and/or energy-consuming units, in particular generators, stores and consumers, may be arranged within a network section which is connected, as a subnetwork, to a superordinate alternating voltage network. In particular, the subnetwork may comprise a photovoltaic installation, which feeds electrical power into the subnetwork via a single-phase or multiphase inverter, and may supply consumers which draw electrical power from the subnetwork via a single-phase or multiphase connection. Furthermore, an electrical store, in particular a battery, can either draw electrical power from the subnetwork or can feed electrical power into the subnetwork via a single-phase or multiphase battery converter.

Conventional connection points are designed to transmit a limited electrical power from the alternating voltage network into the subnetwork. On account of increasing decentralized energy production, on the one hand, which causes a high and temporally volatile electrical power in the subnetwork or in the vicinity of the subnetwork, in particular in the case of regenerative energy producers, and on account of the increasing spread of consumers with a high and likewise temporally volatile power requirement, on the other hand, in particular in the field of electro-mobility, the load on a connection point and also on the alternating voltage network as a whole may reach a critical order of magnitude. For example, a situation may occur in the evening or at night in which an electric vehicle or a plurality of electric vehicles is/are intended to be charged with high power within a subnetwork, whereas a photovoltaic installation arranged in the subnetwork or in the vicinity of the subnetwork simultaneously does not produce any electrical power, with the result that a very high power must be provided by the superordinate alternating voltage network and must be fed into the subnetwork via the connection point. As a result, the connection point and also the alternating voltage network are heavily loaded and there is the risk of overloading of the connection point and even of the alternating voltage network as a whole. In addition, switching operations within a subnetwork may cause peak loads which endanger the stability of the connection point and of the alternating voltage network.

Previous solution approaches for this comprise, for example, temporally staggered operation or limitation of the charging power for electric vehicles at particular times and/or on the basis of the corresponding local production and the use of buffered energy from energy stores possibly arranged in the subnetwork. However, a blanket limitation of the charging power has the effect of a loss of convenience by virtue of the charging times for the electric vehicle being extended. The use of energy stores increases the costs and, on account of inherently limited reaction speeds, is suitable only to a limited extent for avoiding peak loads.

Overloading of a connection point, for example a fuse at a network connection point, can also be avoided by means of current control during which phase-resolved measured values of the current at the connection point are used as a control variable. Such current control also has a limited dynamic response and can react only to a limited extent to a base load which cannot be controlled and is sometimes very sudden in the subnetwork. In addition, conventional current control acts independently on the individual phases of a subnetwork and cannot handle any cross-phase boundary conditions, as are regularly predefined, for example, by electric vehicles in the form of a minimum total power required for charging. In addition, it is generally not known how many phases and which phases of a subnetwork which consumers are specifically connected to, in which case consumers connected in a multiphase manner also do not necessarily draw symmetrical currents from the phases of the subnetwork and an assignment of the phases of a multiphase consumer to the phases of the subnetwork is normally unknown. Therefore, current control operating in a phase-specific manner cannot reliably avoid or limit unbalanced loads, for example, even if it is possible to specify to a consumer connected in a multiphase manner, in particular an electric vehicle, how much current can be drawn at most for each phase.

SUMMARY

The disclosure is directed to a method for controlling an electrical power which flows into or out of a subnetwork via a connection point, a device for connecting a subnetwork to an alternating voltage network, and a method for operating a subnetwork, which ensure that a connection point of the subnetwork to the alternating voltage network is operated within predefined specifications and, in particular, is not overloaded and is not an impermissible unbalanced load for the alternating voltage network.

In a method for controlling an electrical power which flows into or out of an electrical subnetwork via a connection point, the subnetwork has at least one electrical load, wherein the electrical load is connected to a control device via a communication connection. In the method, the electrical power flowing via the connection point is measured, and a maximum power consumption of the electrical load is set by means of the control device on the basis of the electrical power flowing via the connection point.

Setting the maximum power consumption of the electrical load by means of the control device makes it possible to ensure that the connection point of the subnetwork to the alternating voltage network is operated within predefined specifications without a specific power consumption being prescribed for the electrical load. In particular, the electrical load can therefore draw a variable electrical power if necessary as long as its power consumption is lower than the maximum power consumption.

Within the scope of the method, a power output of an energy store arranged in the subnetwork and/or of an energy production unit arranged in the subnetwork can also be set by means of the control device on the basis of the electrical power flowing via the connection point. Feeding electrical power into the subnetwork by means of an energy store or an energy production unit makes it possible to reduce the electrical power flowing into the subnetwork from the alternating voltage network via the connection point without having to reduce the power consumption of the electrical load.

Alternatively or additionally, the maximum power consumption of the electrical load can be reduced by the control device, in particular if the electrical power flowing into the subnetwork via the connection point exceeds a predefined limit value. This is advantageous, in particular, when, in addition to the electrical load communicatively connected to the control device, there are further electrical loads within the subnetwork, the behavior of which cannot be directly influenced.

In this case, a maximum power consumption of zero can be set if the electrical power flowing into the subnetwork via the connection point exceeds the predefined limit value. As a result of a set value of zero for the maximum power consumption, the electrical load is at least briefly disconnected, with the result that only an electrical power needed to supply the loads which cannot be influenced flows into the subnetwork via the connection point, possibly minus the power directly fed in by an energy store and/or an energy production unit within the subnetwork. In particular, in the event of a sudden exceeding of the predefined limit value for the electrical power flowing via the connection point, which can occur as a result of a load which cannot be influenced being switched on for example, the loads arranged in the subnetwork are therefore prevented from requiring a total power from the alternating voltage network which cannot be transferred via the connection point.

After such disconnection of the load communicatively connected to the control device, the maximum power consumption can be gradually increased again, wherein the electrical power flowing into the subnetwork via the connection point is compared with the predefined limit value after each step of increasing the maximum power consumption, and the maximum power consumption is increased further only when the electrical power flowing into the subnetwork via the connection point continues to undershoot the predefined limit value. As a result, all electrical loads in the subnetwork, in particular the loads which cannot be influenced, can still be operated without overloading the connection point, wherein the load communicatively connected to the control device can draw an electrical power which, although limited, is generally sufficient for its operation.

In one embodiment of the method, the measurement of the electrical power flowing via the connection point can comprise measuring currents flowing via individual phases of the connection point. This is particularly advantageous if the subnetwork and/or the superordinate alternating voltage network is/are a multiphase network, in particular a three-phase network. The measurement of the individual phase currents is particularly advantageous if the electrical loads in the subnetwork have a single-phase design and are connected to different phases or have a multiphase design and are connected in a multiphase manner, but are an unbalanced load by virtue of the fact that they drain different powers from the different phases. In particular, the load communicatively connected to the control device can also be connected in a three-phase manner and can have unbalanced load capability.

The maximum power consumption can be reduced, in particular, when at least one of the currents flowing via the individual phases of the connection point exceeds a predefined limit value. This is particularly advantageous if the individual phases of the connection point are individually protected, for example via fuses or circuit breakers. In addition, the maximum power consumption can be set for the electrical load communicatively connected to the control device in such a manner that maximum values for a current consumption from the respective phase are predefined for individual phases of the subnetwork from which this electrical load consumes electrical power. In particular, a maximum value for a current consumption from a phase can be reduced in this case if the current flowing via this phase at the connection point exceeds a predefined limit value or if a difference between this current and a current flowing via another phase at the connection point exceeds a predefined limit value, that is to say an impermissible unbalanced load is therefore present. It is therefore possible, in particular, to compensate for any impermissible unbalanced load, caused by loads which are connected in a single-phase manner and cannot be influenced, at the connection point by virtue of the electrical load communicatively connected to the control device in turn drawing electrical power in an asymmetric manner from the individual phases. In particular, an absolute value of the reduction in the maximum value for the current consumption from a phase of the subnetwork may be proportional in this case to an absolute value of the exceedance of the limit value for the current flowing via this phase of the connection point.

In one embodiment of the method, the maximum values for the current consumption for all phases from which the electrical load communicatively connected to the control device consumes electrical power can be set to zero if a maximum power consumption of this electrical load, which is below a predefined minimum value for the power consumption of this load, results from reducing maximum values for the current consumption, for example on account of an impermissible unbalanced load at the connection point. Such minimum values for a power consumption are normally predefined for particular loads, for example for electric vehicles which require a minimum charging power.

Alternatively, the maximum value for the current consumption from a first phase can be increased if the maximum value for the current consumption from a second phase is reduced and the maximum value for the current consumption from the first phase is below the predefined limit value. The maximum power consumption of the electrical load with unbalanced load capability which is communicatively connected to the control device can therefore be kept constant even if there were the risk of overloading of an individual phase of the connection point in the case of symmetrical operation of this load.

A device for connecting a multiphase subnetwork, which has an energy production installation and an energy store, to a superordinate multiphase alternating voltage network is configured to transmit electrical power between the alternating voltage network and the subnetwork and comprises an AC/AC converter having a network connection, two inverter bridge circuits with an interposed intermediate circuit and a subnetwork connection. A device according to the disclosure comprises a control device which is configured to set the electrical powers flowing via the individual phases of the subnetwork connection on the basis of power values of the energy production installation and of the energy store by suitably controlling the inverter bridge circuits.

Such a device is able both to set the electrical power transmitted overall between the alternating voltage network and the subnetwork and to decouple partial powers on individual phases of the subnetwork connection from partial powers on individual phases of the network connection. In particular, the device may constitute a connection point of the subnetwork to the alternating voltage network, which connection point can be operated in a protected manner within predefined specifications by means of the embodiment according to the disclosure. In this case, the control device may be communicatively connected to the energy production installation and/or the energy store and may be configured to communicatively receive the power values of the energy production installation and/or of the energy store. Alternatively or additionally, the control device may also be communicatively connected to a network control center, in particular in order to predefine specifications for operating the connection point from the point of view of a network operator. In addition, the control device may be configured to set the electrical powers flowing via the individual phases of the network connection on the basis of communicatively transmitted preset values from the network control center by suitably controlling the inverter bridge circuits. This makes it possible, in particular, to comply with limit values for the electrical power drained from the alternating voltage network and any unbalanced load limit values.

In one embodiment, the AC/AC converter can comprise the energy store in a structural unit, wherein the device may be configured to feed electrical power into the energy store or to drain electrical power from the energy store by means of at least one of the inverter bridge circuits. A device which can be universally used as a connection point is therefore available and makes it possible to largely decouple the operation of electrical loads within the subnetwork from the electrical power drained from the alternating voltage network. In one embodiment, this device may be configured to provide an alternating voltage having a predefined frequency and amplitude and a corresponding alternating current within the subnetwork for the purpose of operating loads arranged in the subnetwork.

In a method for operating a multiphase subnetwork, the subnetwork comprises a photovoltaic installation and an energy store and is connected to a superordinate multiphase alternating voltage network via an AC/AC converter, wherein the AC/AC converter is configured to transmit electrical power between the alternating voltage network and the subnetwork and has a network connection, two inverter bridge circuits with an interposed intermediate circuit and a subnetwork connection. According to the disclosure, the inverter bridge circuits are controlled in such a manner that the electrical powers flowing via the individual phases of the subnetwork connection of the AC/AC converter are set on the basis of power values of the energy production installation and of the energy store.

In one embodiment, the inverter bridge circuits may be controlled in such a manner that the electrical powers flowing via the individual phases of the network connection of the AC/AC converter are set in such a manner that a maximum difference between the electrical powers flowing via the individual phases of the network connection of the AC/AC converter is below a predefined unbalanced load limit value and, in particular, is less than a maximum difference between electrical powers flowing via the individual phases of the subnetwork connection of the AC/AC converter and/or is at least close to zero.

In one embodiment, the energy store may be connected to the subnetwork via a bidirectional inverter and may provide an alternating voltage having a predefined frequency and amplitude for the purpose of operating loads arranged in the subnetwork. In this case, the electrical power flowing via the subnetwork connection of the AC/AC converter may be set on the basis of the deviation of the frequency in the subnetwork from a predefined reference frequency. This makes it possible to determine the electrical properties of the subnetwork by means of the inverter of the energy store and to thus compensate, in particular, for a power imbalance within the subnetwork, for example, by means of the energy store, and to signal a requirement for electrical power to be additionally drawn from the alternating voltage network or to be fed into the alternating voltage network to the AC/AC converter using a change in the frequency within the subnetwork, whereupon the AC/AC converter can accordingly adapt the electrical power exchanged with the alternating voltage network.

In an alternative embodiment, the AC/AC converter may comprise the energy store in a structural unit and may feed electrical power into the energy store or may drain it from the energy store by means of at least one of the inverter bridge circuits. In this case, it is advantageous for the AC/AC converter to provide an alternating voltage having a predefined frequency and amplitude and a corresponding alternating current at its subnetwork connection for the purpose of operating loads arranged in the subnetwork. As a result, the AC/AC converter acts as a network former for the subnetwork.

The device according to the disclosure can also be characterized by the following aspects:

The connection point may be designed as an AC/AC converter and may be arranged in such a manner that it can consume power from the alternating voltage network and can output it to the subnetwork. This power exchange can be respectively carried out on both sides of the connection point in a network-compliant manner, that is to say in particular with regard to normatively predefined technical connection conditions (reactive power, unbalanced load, behavior in the event of a network fault etc.) in the direction of the alternating voltage network and in particular with regard to limit values for the frequency and voltage amplitude to be provided in the direction of the subnetwork.

In this case, the converter can be designed in such a manner that it sets up an island network in the direction of the subnetwork and, in particular, adapts the transfer of electrical power into the subnetwork to the requirement within the subnetwork. This adaptation can be associated with a signaling of the power balance at the connection point, wherein this signaling may, for example, comprise influencing the subnetwork frequency generated by the AC/AC converter on the basis of the power balance at the connection point.

The subnetwork can, in one embodiment, be designed according to the local requirements. If only single-phase loads need to be supplied, the island network can have a single-phase design; if three-phase loads need to be supplied, the island network must be provided in a three-phase manner. This can be carried out independently of the network connection of the connection point since suitable coupling between a single-phase or multiphase network connection and the single-phase or multiphase subnetwork can be established by means of the AC/AC converter. The subnetwork connection of the AC/AC converter can then meet the requirements of the subnetwork and the network connection of the AC/AC converter can meet the requirements of the alternating voltage network.

Such an AC/AC converter may typically be constructed from two inverter bridge circuits that are coupled via an intermediate circuit, in which case DC-isolation may be additionally provided. The alternating voltage network can be decoupled from the subnetwork via the AC/AC converter, with the result that switching actions in the subnetwork do not have any (direct) effects on the alternating voltage network. As a result, the subnetwork can be decoupled from the network connection to the alternating voltage network without entirely capping the connection. The connected loads in the subnetwork can, in one embodiment, be supplied from the energy production installation arranged in the subnetwork and possibly from energy buffered in an energy store. A (limited) power can be additionally drawn from the alternating voltage network or can be fed into the alternating voltage network if necessary.

The method according to the disclosure for controlling an electrical power which flows into or out of an electrical subnetwork via a connection point can be further characterized by the following aspects:

The method may comprise current control during which phase-resolved current values at the connection point or at a fuse can be used as a control variable. The control makes it possible to avoid an overload on one phase or on a plurality of phases, in particular. The dynamics of the control problem can be considerably increased in this case by loads which cannot be controlled and are sometimes very sudden in the subnetwork.

The method can take into account cross-phase boundary conditions and can take into account incomplete information relating to electrical properties of the loads in the subnetwork. In addition to a phase current, the control aim may also be a limitation of the total current on a phase below a preset value. Appropriate manipulated variable values may be setpoint specifications for the loads and phase-specific limitations of the current consumption of loads.

In one embodiment, the method may determine a set of current specifications or current limit values for a load in the subnetwork, for example an electric vehicle, in which case one or more of the following conditions can be taken into account:

(a) the total current per phase should be less than a maximum value for this phase at the connection point to the alternating voltage network;
(b) a current specification should be within a predefined band or should be zero for each load that can be influenced per phase;
(c) a sum of the current specifications for the loads, in particular for electric vehicles, should be greater than a predefined minimum total current for this load (or equal to zero).

For loads, in particular electric vehicles, for which it is unknown which phase or phases they are connected to, it can be assumed, as the worst case, that the automobile follows the current specification on each phase. In this form, the calculation of power specifications can be tackled by means of so-called mixed-integer linear programming.

In a further embodiment, phase-resolved manipulated variable values for a maximum current consumption for each of the loads which can be influenced in the subnetwork, in particular for electric vehicles, can be determined within the bandwidth predefined by the respective load by means of three mutually independent P, PI or PID controllers. In this case, an aim may be the limitation of a three-phase electrical power at the connection point or at a fuse below a maximum value. At suitable points in the calculation of the phase-resolved manipulated variable values for a load, cross-phase boundary conditions, in particular a minimum total current for an electric vehicle, can be checked and the compliance with the boundary conditions can be ensured using suitable heuristics, if appropriate. Furthermore, at suitable points in the calculation, heuristics can be used to ensure the control aim despite any lack of information, for example with regard to the assignment of individual loads to different phases of the subnetwork. In this case, it proves to be particularly advantageous if a control aim need not be predefined as particular set points at the connection point, but rather can merely comprise the compliance with an upper limit.

Embodiments of the method can be characterized by the following aspects:

A difference between a permissible maximum current, in particular for each phase, and a current for supplying loads which cannot be influenced in the subnetwork (a "base load current") can be usefully distributed among the loads which can be influenced, in which case the above-mentioned boundary conditions can be taken into account. In this case, control deviations, in particular exceedances of a limit value for a current at the connection point of the subnetwork, can result in a proportional decrement of the maximum values set for the loads which can be influenced. Such control deviations can, in one embodiment, be processed by means of a P controller or a PID controller.

A maximum permissible total current for each phase can be predefined by an electrical fuse. Brief exceedances of this maximum permissible total current which cannot be avoided and occur under certain circumstances, for example on account of unpredictable fluctuations in an above-mentioned base load, can be uncritical for such fuses. An advantageous embodiment can therefore comprise subtracting an offset from the control aim, which offset is proportional to such a brief exceedance. If, for example, a permissible maximum current at a connection point or a fuse is 16 amperes and an exceedance of 1 ampere was measured, a value for the permissible maximum current, which is used during control, can be reduced to 15 amperes. This offset can be reduced again using a time constant. Applying such an offset to the control aim then corresponds to a D component of a PID controller, in which case a reduction in the offset over time can correspond to an I component of a PID controller.

Energy stores can be taken into account in the method according to one embodiment. An energy store, in particular a battery, can contribute to complying with the current limit value at the connection point by means of deliberate discharge. Furthermore, an energy store can be used to increase a private consumption of energy from an energy production installation, which energy is produced within the subnetwork. It can therefore be advantageous to initially disregard an electrical power exchanged between the energy store and the subnetwork and, in particular, to not include it in the above-mentioned base load, to then determine set points for loads which can be influenced in the sense of the control described above and to only then determine a possible set point for an electrical power to be exchanged between the energy store and the subnetwork. It is therefore possible to ensure that the energy store is not discharged in favor of an unnecessarily high power consumption by the loads.

In one embodiment of the method, power sources with unbalanced load capability within the subnetwork can be taken into account, in particular energy stores and/or energy production installations with unbalanced load capability, by virtue of these power sources feeding electrical power into those phases to which single-phase loads are connected or at which the greatest base load is present. The aim of control may also in this case be to operate as many loads as possible within their own boundary conditions without exceeding a limit value for currents at a connection point or at a fuse.

BRIEF DESCRIPTION OF THE DRAWINGS

The disclosure is explained and described in more detail below on the basis of exemplary embodiments illustrated in the figures.

DETAILED DESCRIPTION

Figure 1:
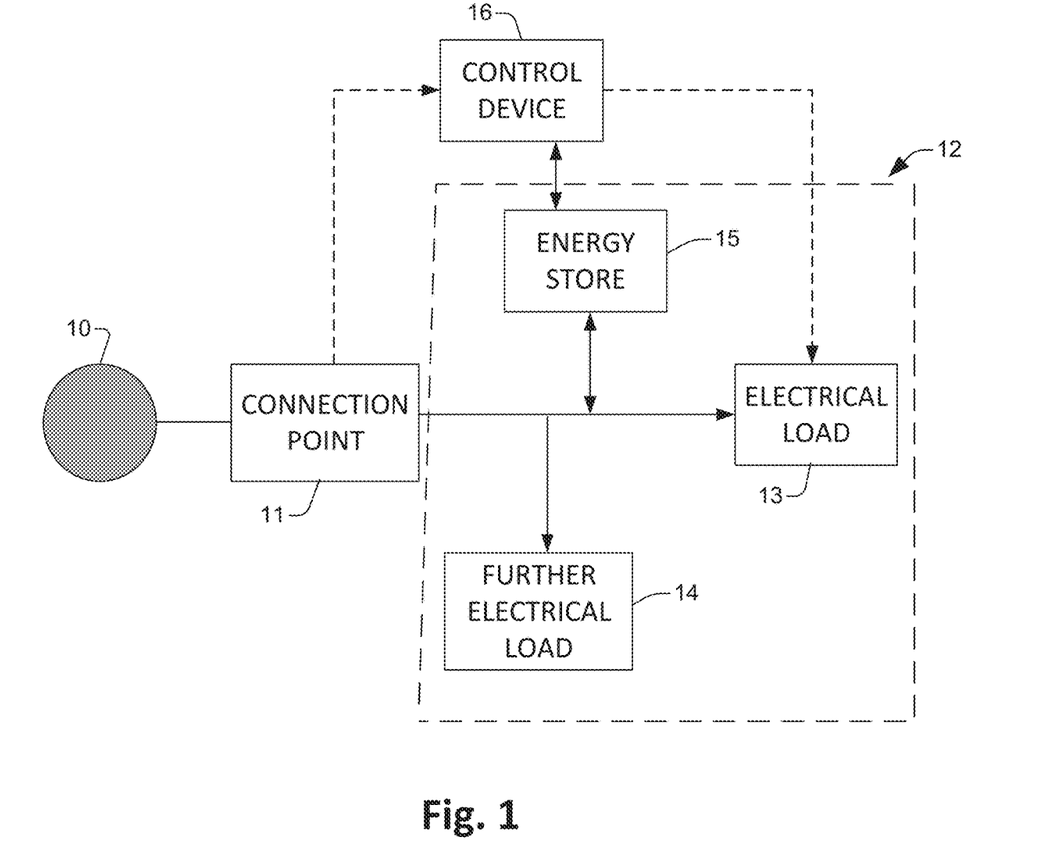
FIG. 1 shows a subnetwork connected to an alternating voltage network via a connection point.

FIG. 1 shows an alternating voltage network 10 and a subnetwork 12 connected to the alternating voltage network 10 via a connection point 11. An electrical load 13 which is supplied with electrical power via the connection point 11 is arranged in the subnetwork 12. The subnetwork 12 may comprise a further load 14, which can be supplied with electrical power via the connection point 11, and may have an energy store 15, for example a battery, which may exchange electrical power with the subnetwork 12 in a bidirectional manner and may therefore alternatively or additionally supply the loads 13, 14; for this purpose, the energy store 15 may comprise a bidirectional inverter, in particular.

The connection point 11 may have a single-phase or multiphase design and may have measuring devices for measuring the electrical power flowing via the connection point 11, in particular current sensors which can capture currents flowing via the individual phases of the connection point. A control device 16 may be connected to the connection point via a communication connection, with the result that the control device 16 can receive and evaluate the currents captured at the connection point 11 and the electrical power flowing via the connection point 11.

The control device 16 may be connected to the load 13 via a further communication connection, with the result that the control device 16 can transmit control commands to the load 13. Such control commands may comprise, in particular, preset values for a maximum power consumption of the load 13, in which case these preset values can predefine the maximum power consumption of the load 13 in the form of a maximum electrical power P or in the form of maximum values for the currents drawn by the load 13 from the individual phases of the subnetwork 12.

The control device 16 may be connected to the energy store 15 via a further communication connection. This communication connection may be used to transmit information relating to the state of the energy store 15 to the control device 16, in which case this information may comprise, in particular, an instantaneous state of charge of the energy store 15 and an electrical power currently exchanged between the energy store 15 and the subnetwork 12. This communication connection may also be used to transmit control commands from the control device 16 to the energy store 15, in which case the control commands may comprise, in particular, preset values for the electrical power to be fed into the subnetwork 12 by the energy store 15 or the electrical power to be drained from the subnetwork 12.

The communication connections illustrated using dashed lines in FIG. 1 may be designed in a unidirectional or bidirectional manner, in which case it fundamentally suffices for the method according to the disclosure to design the communication connections in a unidirectional manner, with the result that measured values can be transmitted from the connection point 11 to the control device 16 and preset values can be transmitted from the control device 16 to the load 13.

Figure 2:
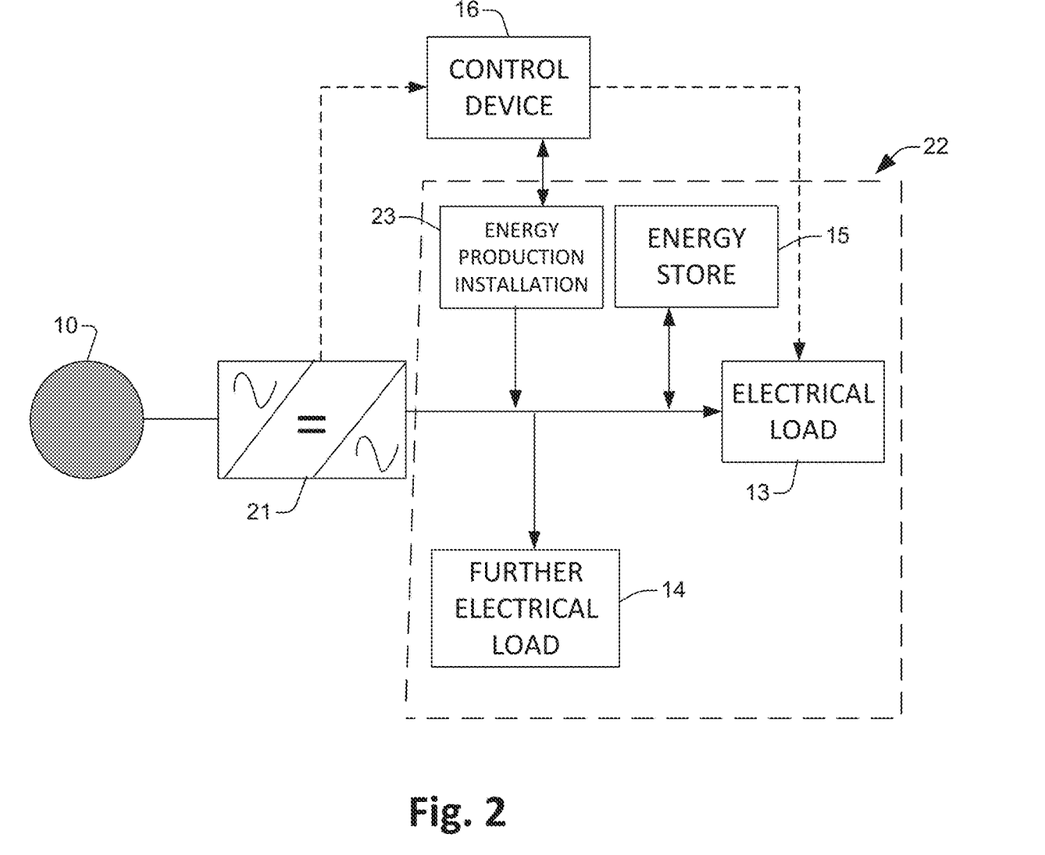
FIG. 2 shows a subnetwork connected to an alternating voltage network via an AC/AC converter.

FIG. 2 shows a subnetwork 22 which is connected to the alternating voltage network 10 via an AC/AC converter 21 as the connection point. An electrical load 13 which may be supplied with electrical power via the AC/AC converter 21 is arranged in the subnetwork 22. The subnetwork 12 may comprise a further load 14 which is supplied with electrical power via the connection point 11. The AC/AC converter 21 may be connected, on the input side, to the alternating voltage network 10 in a single-phase or multiphase manner and may be connected, on the output side, to the subnetwork 22 in a single-phase or multiphase manner and may be connected to the control device 16 via a unidirectional or bidirectional communication connection. This communication connection can be used to transmit measured values from the AC/AC converter 21 to the control device 16, in which case these measured values may comprise, in particular, measured values of the single-phase or multiphase currents flowing between the alternating voltage network 10 and the subnetwork 22, which measured values are captured by the AC/AC converter 21. This communication connection can also be used to transmit control commands from the control device 16 to the AC/AC converter 21, in which case these control commands may comprise, in particular, preset values for operating the AC/AC converter 21. These preset values can be used to predefine, for example in the case of a given electrical power which flows into the subnetwork 22, from which phases of the alternating voltage network 10 which currents are drawn, in which case the sum of the currents drawn overall from the alternating voltage network 10 corresponds to the sum of the currents flowing into the subnetwork 22. In other words, the AC/AC converter 21 may draw symmetrical currents from the alternating voltage network 10, for example, that is to say identical currents on all phases, and may feed them into the subnetwork 22 in an asymmetrical manner, that is to say may provide different currents on the phases of the subnetwork 22. Conversely, the AC/AC converter 21 may also draw asymmetrical currents from the alternating voltage network 10 and may feed symmetrical currents into the subnetwork 22. Predefining corresponding control commands by means of the control device 16 therefore makes it possible to operate the AC/AC converter 21 differently, if necessary, for example in order to comply with requirements of the alternating voltage network 10 and/or of the subnetwork 22 with respect to the ratios of the currents between the phases on the input side and/or output side of the AC/AC converter.

An energy store 15 which is connected to the subnetwork 22 in a suitable form, in particular via a bidirectional inverter, may also be arranged in the subnetwork 22 and may drain electrical power from the subnetwork 22 and feed it into the subnetwork 22 and may therefore alternatively or additionally supply the loads 13, 14. In this case, the energy store 15 may be configured, with the aid of the associated inverter, to determine the electrical parameters of the subnetwork 22, that is to say to regulate the frequency and voltage of the subnetwork and to therefore act as a network former for the subnetwork 22. In such a case, the AC/AC converter 21 follows the network-forming specifications of the inverter of the energy store 15 with regard to the electrical power flowing via its subnetwork connection.

An energy production installation 23, for example a photovoltaic installation, which produces an electrical power and feeds it into the subnetwork 22 in a suitable form, in particular via an inverter and, in particular, for the purpose of alternatively or additionally supplying the loads 13, 14, may also be arranged in the subnetwork 22. The energy production installation 23 may be connected to the control device 16 via a further, in particular bidirectional, communication connection (not illustrated), wherein operating data relating to the energy production installation 23 can be transmitted to the control device 16, on the one hand, and control commands can be transmitted from the control device 16 to the energy production installation 23, on the other hand, via this communication connection.

Figure 3:
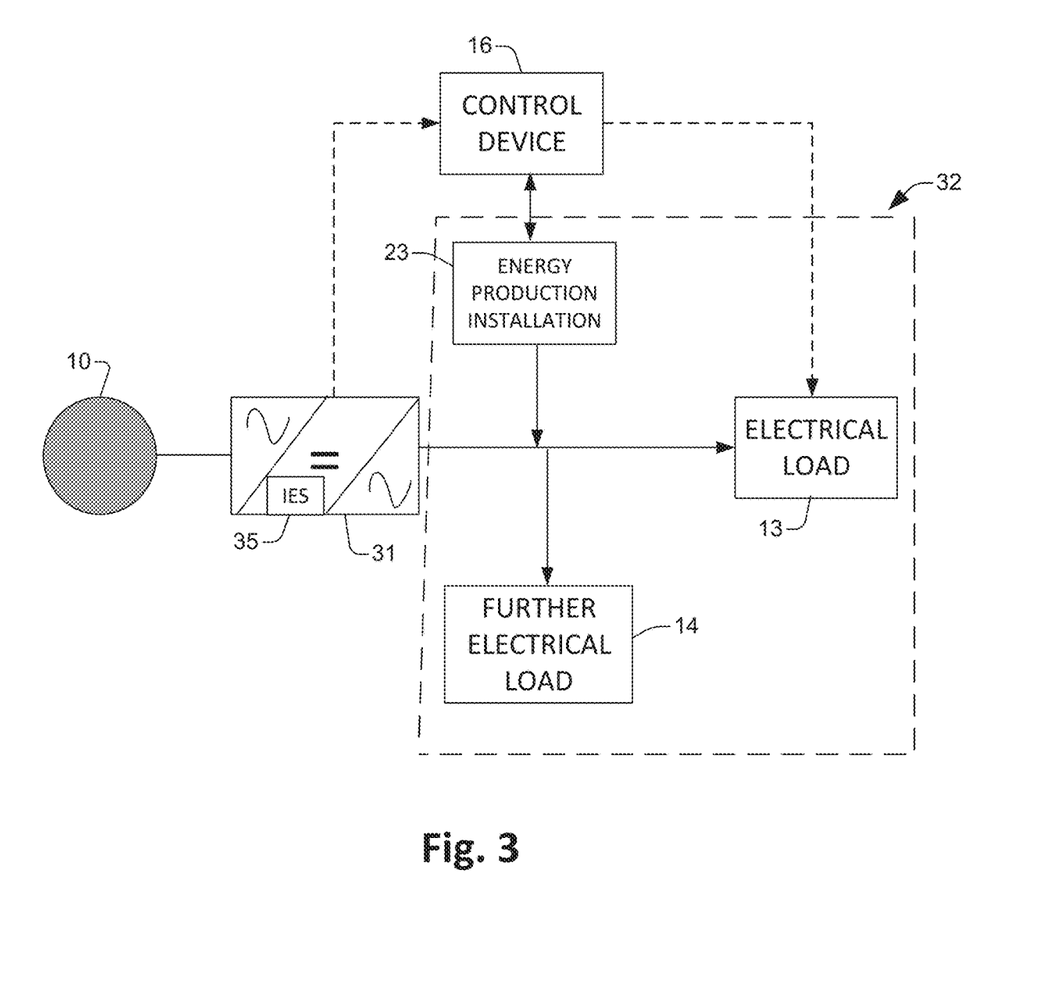
FIG. 3 shows a further embodiment of a subnetwork connected to an alternating voltage network via an AC/AC converter.

FIG. 3 shows a subnetwork 32 which is connected to the alternating voltage network 10 via an AC/AC converter 31 as the connection point, wherein the AC/AC converter 31 has an integrated energy store 35. The energy store 35 is, in one embodiment, connected to a DC link circuit of the AC/AC converter 31, in particular via a DC/DC converter, and may drain electrical power from the DC link circuit or may feed electrical power into the latter. The further components have already been described in connection with FIGS. 1 and/or 2.

It goes without saying that both the alternating voltage network 10 and the subnetworks 12, 22, 32 may each have a single-phase, two-phase (in particular a so-called split-phase) or three-phase design, wherein the components 13, 14, 15, 23 arranged in the subnetworks 12, 22, 32 may likewise have a single-phase design in the case of a single-phase design of the subnetwork 12, 22, 32 and may each have a single-phase or multiphase design in the case of a multiphase design of the subnetwork 12, 22, 32.

Figure 4:
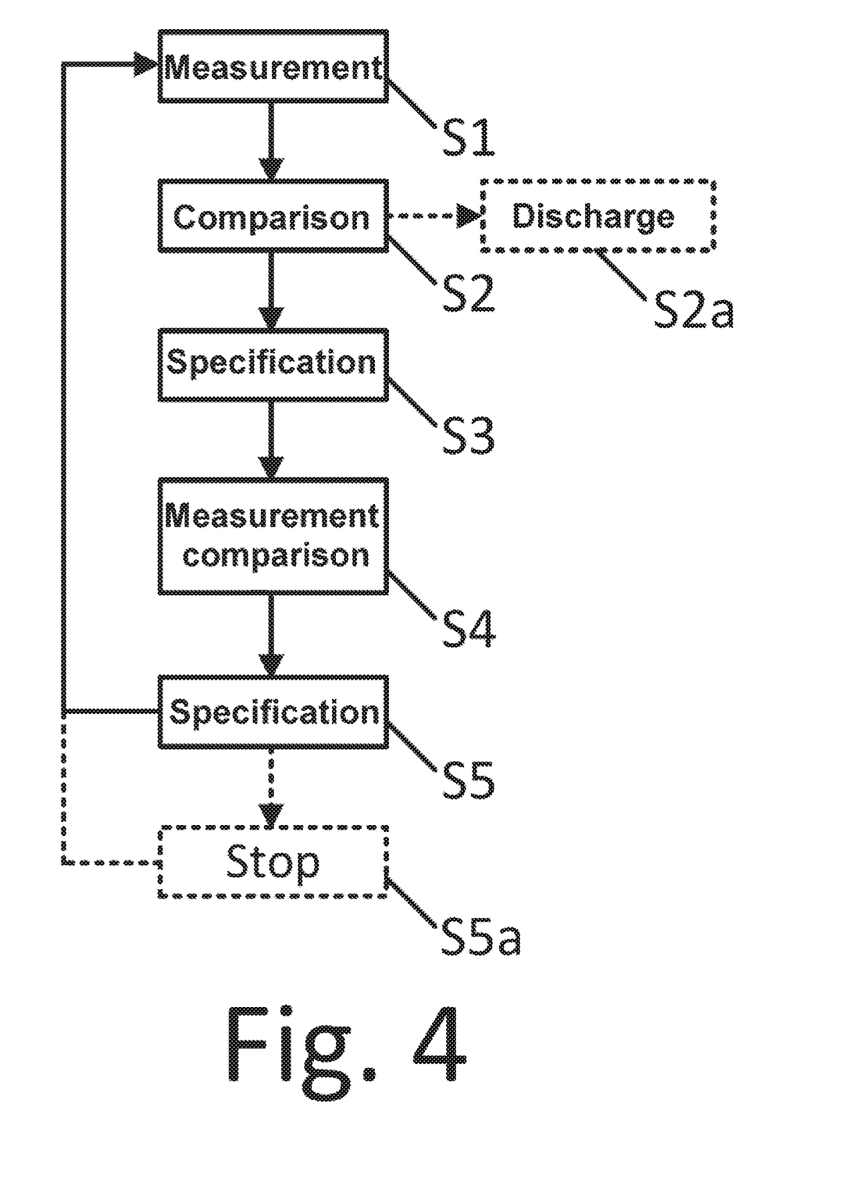
FIG. 4 shows a flowchart of a method according to the disclosure.

FIG. 4 schematically shows a method for controlling an electrical power which flows from the alternating voltage network 10 into the subnetwork 12, 22, 32 or from the subnetwork 12, 22, 32 into the alternating voltage network 10 via the connection point 11 or the AC/AC converter 21.

At S1, an electrical power flowing via the connection point 11 or the AC/AC converter 21, 31 is measured, in which case this measurement may comprise possibly phase-resolved capture of the currents flowing via the connection point 11 or the AC/AC converter 21, 31.

At S2, the values measured at S1 are compared with predefined limit values. This comparison may be based on a measured power, a measured total current, measured currents on individual phases and/or differences (unbalanced load) between currents on individual phases.

In an optional act S2a, a power output can be set for an energy store 15, 35 possibly arranged in the subnetwork 12, 22 and/or in the AC/AC converter 31, and the energy store can be discharged at least partially, in particular if it has been determined at S2 that a limit value has been exceeded.

At S3, a maximum power consumption is set for the load 13, connected to the control device 16 according to one of FIGS. 1 to 3, on the basis of the measurement according to S1 and the comparison according to S2. This specification may comprise a set point for a maximum electrical power and/or possibly phase-resolved set points for maximum currents which can be drawn by the load 13.

At S4, the measurement carried out at S1 and the comparison carried out at S2 are repeated. Depending on the result of the comparison at S4, the set point according to act S3 is modified, if necessary, at S5; in particular, the set point according to act S3 is reduced if it has been determined at S4 that a limit value has been exceeded. In optional act S5a, the power consumption of the load 13 can be stopped, in particular, for example by setting the set point to zero, if it has been determined at S4 that a limit value has been repeatedly exceeded and/or if it is determined that the set point set at S5 would cause a maximum power consumption of the load below a minimum value for the power consumption of the load 13.

Finally, the method branches back to S1 and the method is run through again. If a set point has been reduced on account of a limit value being exceeded in a run of the method, in particular at S3 and/or at S5, the set point can be reduced further in a following run of the method if the limit value is still exceeded, or the set point can be increased and/or the possible power output from the energy store 15, 35 can be reduced if it is no longer determined that the limit value has been exceeded.

The invention claimed is:

1. A device for connecting a multiphase subnetwork to a superordinate multiphase alternating voltage network, wherein the multiphase subnetwork has an energy production installation and an energy store, wherein the device is configured to transmit electrical power between the superordinate multiphase alternating voltage network and the multiphase subnetwork and comprises an AC/AC converter having a network connection, two inverter bridge circuits with an interposed intermediate circuit and a multiphase subnetwork connection, and a control device which is configured to set individually the electrical powers flowing via individual phases of the multiphase subnetwork connection on the basis of power values of the energy production installation and/or on the basis of power values of the energy store by controlling the inverter bridge circuits of the AC/AC converter.

2. The device as claimed in claim 1, wherein the control device is communicatively connected to the energy production installation and/or the energy store and is configured to communicatively receive the power values of the energy production installation and/or of the energy store, respectively.

3. The device as claimed in claim 1, wherein the control device is communicatively connected to a network control center and is configured to set individually the electrical powers flowing via the individual phases of the multiphase subnetwork connection of the AC/AC converter on the basis of communicatively transmitted preset values from the network control center by controlling the inverter bridge circuits of the AC/AC converter.

4. The device as claimed in claim 1, wherein the AC/AC converter comprises the energy store in a structural unit, wherein the AC/AC converter is configured to feed electrical power into the energy store or to drain electrical power from the energy store by means of at least one of the inverter bridge circuits of the AC/AC converter.

5. The device as claimed in claim 1, wherein the AC/AC converter is configured to provide an alternating voltage having a predefined frequency and amplitude and a corresponding alternating current within the multiphase subnetwork to operate loads arranged in the multiphase subnetwork.

6. A method for operating a multiphase subnetwork which comprises an energy production installation and an energy store, wherein the multiphase subnetwork is connected to a superordinate multiphase alternating voltage network via an AC/AC converter, comprising:
    transmitting electrical power between the superordinate multiphase alternating voltage network and the multiphase subnetwork via the AC/AC converter, wherein the AC/AC converter comprises a network connection, two inverter bridge circuits with an interposed intermediate circuit and a multiphase subnetwork connection,
    controlling the inverter bridge circuits of the AC/AC converter to set individually the electrical powers flowing via the individual phases of the multiphase subnetwork connection of the AC/AC converter on the basis of power values of the energy production installation and/or of the energy store.

7. The method as claimed in claim 6, wherein controlling the inverter bridge circuits of the AC/AC converter comprises setting individually the electrical powers flowing via the individual phases of the network connection of the AC/AC converter such that a maximum difference between the electrical powers flowing via the individual phases of the network connection of the AC/AC converter is minimized, wherein said maximum difference is below a predefined unbalanced load limit value and less than a maximum difference between electrical powers flowing via the individual phases of the multiphase subnetwork connection of the AC/AC converter.

8. The method as claimed in claim 6, wherein the energy store is connected to the multiphase subnetwork via a bidirectional inverter and provides an alternating voltage having a predefined frequency and amplitude for the purpose of operating loads arranged in the multiphase subnetwork, further comprising setting the electrical power flowing via the multiphase subnetwork connection on the basis of a deviation of a frequency in the multiphase subnetwork from a predefined reference frequency.

9. The method as claimed in claim 6, wherein the AC/AC converter comprises the energy store in a structural unit, further comprising feeding electrical power into the energy store or draining electrical power from the energy store using at least one of the inverter bridge circuits of the AC/AC converter.

10. The method as claimed in claim 9, wherein the AC/AC converter provides an alternating voltage having a predefined frequency and amplitude and a corresponding alternating current at its multiphase subnetwork connection to operate loads arranged in the multiphase subnetwork.

* * * * *